United States Patent
Zimmer et al.

(10) Patent No.: US 9,626,196 B2
(45) Date of Patent: Apr. 18, 2017

(54) BROADCASTING MANAGEMENT INFORMATION USING FOUNTAIN CODES

(71) Applicant: Intel Corporation, Santa Clara, CA (US)

(72) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 14/222,014

(22) Filed: Mar. 21, 2014

(65) Prior Publication Data
US 2015/0271297 A1    Sep. 24, 2015

(51) Int. Cl.
*H04L 29/06* (2006.01)
*G06F 9/24* (2006.01)
*G06F 9/44* (2006.01)

(52) U.S. Cl.
CPC .......... *G06F 9/4416* (2013.01); *G06F 9/4401* (2013.01)

(58) Field of Classification Search
CPC ..... G06F 9/4401; G06F 9/4416; G06F 9/4406
USPC .......................................................... 709/203
See application file for complete search history.

(56) References Cited

U.S. PATENT DOCUMENTS

| | | | |
|---|---|---|---|
| 2009/0307340 A1* | 12/2009 | Haneefa | G06F 15/177 709/222 |
| 2011/0238987 A1* | 9/2011 | Kherani | H04L 1/0041 713/168 |

OTHER PUBLICATIONS wikipedia.org, "Unified Extensible Firmware Interface," Wikipedia, The Free Encyclopedia, retrieved from: <http://en.wikipedia.org/w/index.php?title=Unified_Extensible_Firmware_Interface&oldid=568995131>, edited Aug. 17, 2013, 13 pages.
wikipedia.org, "Revocation list," Wikipedia, The Free Encyclopedia, retrieved from: <http://en.wikipedia.org/w/index.php?title=Revocation_list&oldid=566398402>, edited Jul. 30, 2013, 4 pages.
wikipedia.org, "Tuesday, Jul. 22, 2014," Wikipedia, The Free Encyclopedia, retrieved from: <http://en.wikipedia.org/w/index.php?title=Fountain_code&oldid=551022985>, edited Apr. 18, 2013, 3 pages.

* cited by examiner

*Primary Examiner* — Tu Nguyen
(74) *Attorney, Agent, or Firm* — Barnes & Thornburg LLP

(57) ABSTRACT

Technologies for broadcasting management information include a management server and a number of client devices. The management server encodes management data such as a certificate revocation list into a number of message fragments using a fountain code encoding algorithm and broadcasts the message fragments continually over a network. Each client device analyzes the network during a boot process to receive the broadcast message fragments. Each client device decodes the message fragments using a fountain code decoding algorithm and determines whether the message is complete. If the message is complete, the client device parses the message to retrieve the management data and may install the management data on the client device. If the message is incomplete, the client device may store the message fragments in nonvolatile storage for processing during future boot events. The client device may perform those operations in a pre-boot firmware environment. Other embodiments are described and claimed.

17 Claims, 4 Drawing Sheets

BROADCASTING MANAGEMENT INFORMATION USING FOUNTAIN CODES

BACKGROUND

Enterprises and other organizations may manage large installations of network-attached machines such as computers, mobile devices, servers, and network infrastructure. The number of managed network-attached devices is likely to continue to increase as networking capabilities are added to more classes of devices, up to and including large numbers of ubiquitous embedded devices. Often, identical management information must be provided to large classes of managed devices. For example, the same security certificate revocation information may be provided to every secure-boot-enabled machine managed by an enterprise. Typical approaches for installing management information include multicasting management information to a large class of homogeneous machines in parallel. However, such approaches typically require synchronization between the sender and receivers, meaning that a large number of receiving devices may be required to synchronize their activity (for example, by listening for multicast information at the same time). Another typical approach for installing management information includes downloading management information from a server by an operating system component or user-mode software application in response to a user request or as a scheduled download. However, such approaches may require user intervention and may be vulnerable to malware and/or security exploits of the operating system and/or software application.

Rateless erasure codes, also known as fountain codes, encode a finite set of k input symbols into an unbounded set of encoded symbols. The input symbols may be decoded from any k' encoded symbols, where k' may be equal to k or slightly larger than k. Common fountain codes include Luby transform codes (LT codes) and Raptor codes. Typical uses for fountain codes include encoding video signals for delivery over an internet protocol (IP) network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
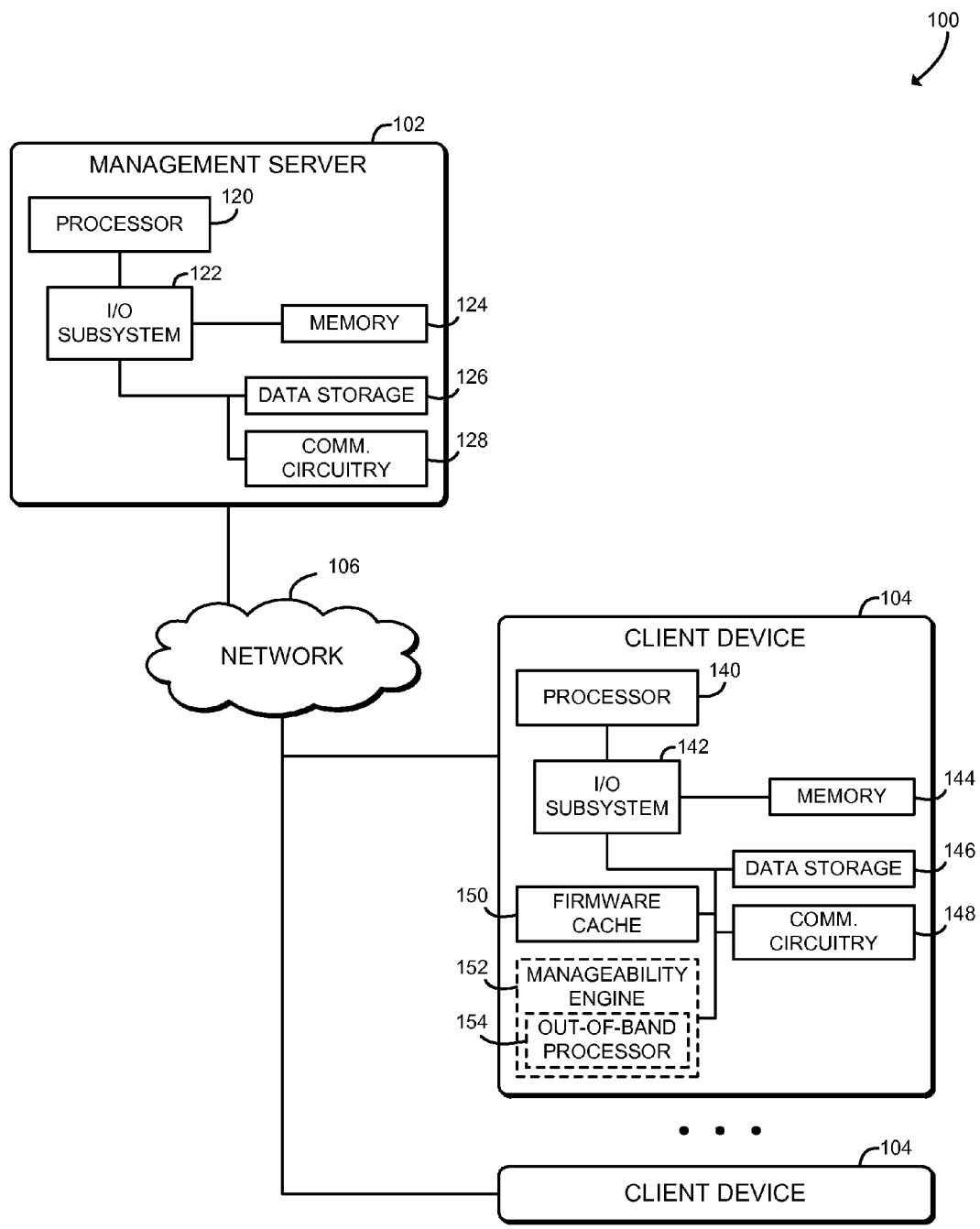
FIG. 1 is a simplified block diagram of at least one embodiment of a system for broadcasting management information from a management server to a number of client devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for broadcasting management data includes a management server 102 and a number of client devices 104 capable of communication over a network 106. In use, as described below, the management server 102 continually, periodically, or responsively broadcasts updated management data over the network 106 that has been encoded with a rateless erasure code, also known as a "fountain code." Whenever a client device 104 is booted, the client device 104 analyzes the network 106 to receive message fragments broadcast by the management server 102. After a sufficient number of message fragments have been received, the client device 104 decodes the message fragments (applying an algorithm appropriate to the particular fountain code in use) and recovers the management data for installation. The client device 104 may collect message fragments over more than one boot cycle before being able to decode a complete message. The disclosed technologies allow standardized management information to be broadcast by a single management server 102 to a large number of client devices 104 asynchronously. In other words, the client devices 104 are not required to synchronize their boot events and may sample the network 106 at arbitrary times, for arbitrary durations. Thus, the client devices 104 may be managed with improved performance and/or scalability. Additionally, the management data may be received and installed by firmware on the client device 104 without the involvement of any operating system of the client device 104. Therefore, potential exploits, vulnerabilities, or software defects in the operating system may be avoided, improving management security and/or reliability.

The management server 102 may be embodied as any type of device for broadcasting management information as described herein. For example, the management server 102 may be embodied as, without limitation, a server computer, a workstation, a desktop computer, a smart phone, a tablet computer, a laptop computer, a notebook computer, a mobile computing device, a cellular telephone, a handset, a messaging device, a vehicle telematics device, a distributed computing system, a multiprocessor system, a consumer electronic device, and/or any other computing device configured to perform the functions described herein. Further, the management server 102 may be embodied as a single server computing device or a collection of servers and associated devices. For example, in some embodiments, the management server 102 is embodied as a cloud service to perform the functions described herein. In such embodiments, the management server 102 may be embodied as a "virtual server" formed from multiple computing devices distributed across the network 106 and operating in a public or private cloud. Accordingly, although the management server 102 is illustrated in FIG. 1 and described below as embodied as single server computing device, it should be appreciated that the management server 102 may be embodied as multiple devices cooperating together to facilitate the functionality described below.

As shown in FIG. 1, the illustrative management server 102 includes a processor 120, an input/output subsystem 122, a memory 124, and a data storage device 126. Of course, the management server 102 may include other or additional components, such as those commonly found in a server and/or a stationary computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the management server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the management server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the management server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store management data to be broadcast to the client devices 104.

The management server 102 further includes a communication circuit 128, which may be embodied as any communication circuit, device, or collection thereof, capable of enabling communications between the management server 102, the client devices 104, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication. The communication circuit 128 may be embodied as a network adapter, including a wireless network adapter.

Each client device 104 may be embodied as any type of device for performing the functions described herein. For example, each client device 104 may be embodied as, without limitation, a smart phone, a tablet computer, a laptop computer, a notebook computer, a mobile computing device, a wearable computing device, a cellular telephone, a handset, a messaging device, a vehicle telematics device, a server computer, a workstation, a distributed computing system, a multiprocessor system, a consumer electronic device, and/or any other computing device configured to perform the functions described herein. As such, each client device 104 may include components and features similar to the management server 102, such as a processor 140, I/O subsystem 142, memory 144, data storage 146, communication circuitry 148, and various peripheral devices. Those individual components of each client device 104 may be similar to the corresponding components of the management server 102, the description of which is applicable to the corresponding components of each client device 104 and is not repeated for clarity of the present description.

Each client device 104 further includes a firmware cache 150. The firmware cache 150 may be embodied as any device that is accessible to a firmware environment of the client device 104 and is configured for persistent storage of data while the client device 104 is powered down or disconnected from a power supply. In the illustrative embodiment, the firmware cache 150 is embodied as a platform flash memory chip. In other embodiments, the firmware cache 150 may be embodied as an embedded non-volatile memory system (e.g., an eMMC device) or as part of a firmware volume maintained on a system partition of the data storage device 146. Thus, in some embodiments, the firmware cache 150 may be incorporated into one or more other components of the client device 104, for example into the I/O subsystem 142. As described below, the firmware cache 150 may be used to persistently store broadcast message fragments received by the client device 104.

In some embodiments, one or more of the client devices 104 may also include a manageability engine 152. The manageability engine 152 is embodied as a device that provides remote configuration, control, or management of the client device 104. The illustrative manageability engine 152 includes an out-of-band processor 154. The out-of-band processor 154 is separate and distinct from the main processor 140 of the client device 104. As such, the manageability engine 152 is capable of operating independently of the state of the rest of the client device 104. That is, the manageability engine 152 is capable of operating regardless of the operating state of the processor 140, including when the client device 104 is powered off, when the client device 104 is executing a pre-boot firmware environment, when an operating system of the client device 104 is active, and when the operating system is crashed or otherwise inactive. The manageability engine 152 is also capable of communicating using the communication circuit 148 independently of the state of the client device 104, also known as "out-of-band" communication. In some embodiments, the manageability engine 152 may include a dedicated network adaptor for such out-of-band communication, in addition to, or instead of, connecting via the communication circuit 148. In some embodiments, the manageability engine 152 may be incorporated into or otherwise form a part of the I/O subsystem 142. Thus, in some embodiments the manageability engine 152 may analyze the network 106 to receive message fragments broadcast by the management server 102 and either installed recovered management data directly or alternately expose the recovered management data for installation by the platform firmware upon a restart event.

Figure 2:
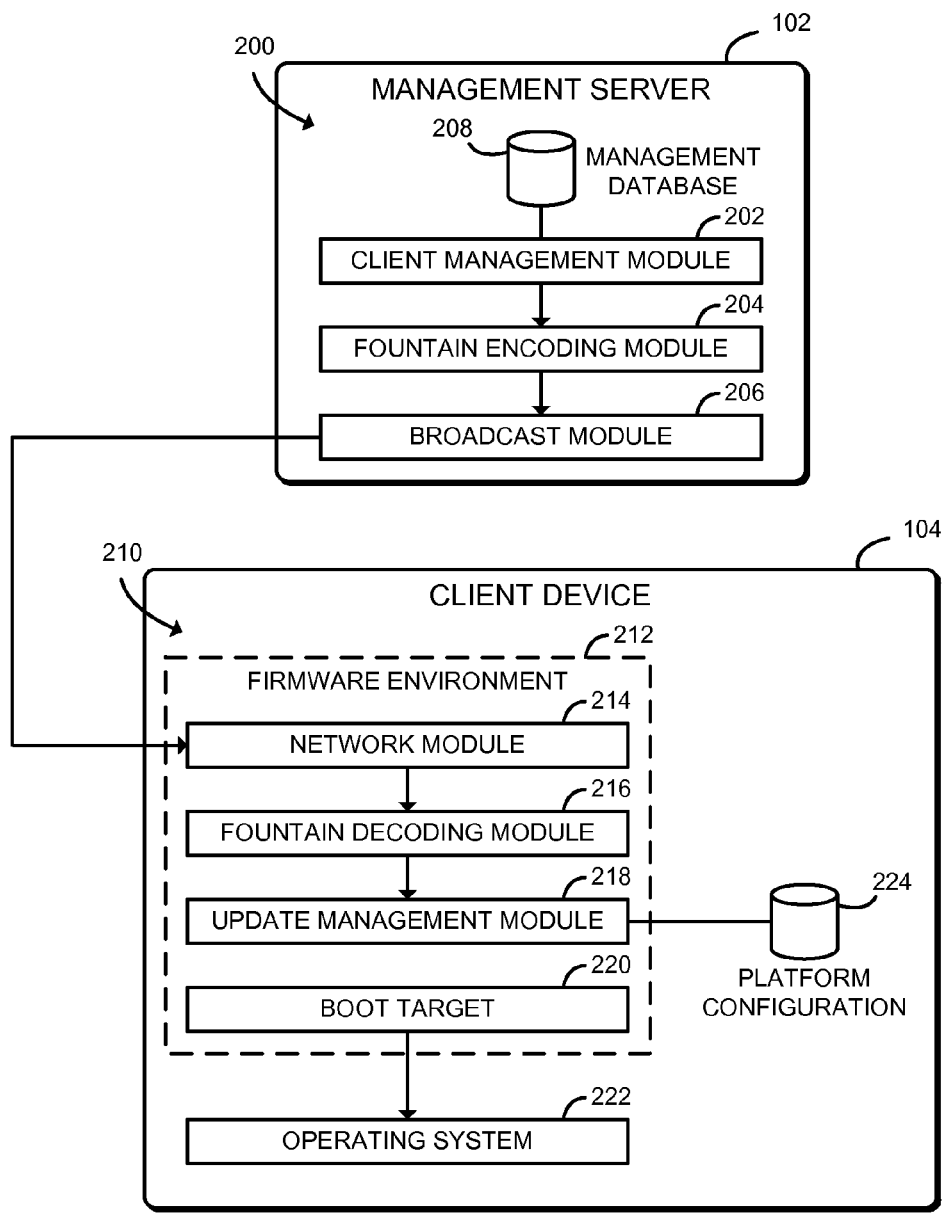
FIG. 2 is a simplified block diagram of at least one embodiment of various environments that may be established by the system of FIG. 1.

Referring now to FIG. 2, in some embodiments the management server 102 establishes an environment 200 during operation. The illustrative environment 200 includes a client management module 202, a fountain encoding module 204, and a broadcast module 206. The various modules of the environment 200 may be embodied as hardware, firmware, software, or a combination thereof.

The client management module 202 is configured to receive or retrieve management data that is to be broadcast to one or more of the client devices 104. The management data may include any information, code, settings, or other data that may be used to provision, configure, or otherwise manage the client devices 104. For example, the management data may include certification revocation lists or other data used to implement an enterprise security policy, firmware images, or software applications. In the illustrative embodiment, the management data is included in the management database 208 referenced by the client management module 202. The management data may be provided or maintained by a network administrator, an enterprise server, or any other source responsible for managing the client devices 104.

The fountain encoding module 204 is configured to encode the management data into a stream of message fragments using a fountain code. As described further below, fountain codes, also known as rateless erasure codes, allow a finite source message to be encoded into a practically unlimited number of encoded output symbols or message fragments. Receivers of the encoded data may recover the source message from any message fragments received, as long as more than a threshold number of message fragments have been received.

The broadcast module 206 is configured to broadcast the encoded message fragments to one or more client devices 104. The broadcast module 206 continually, periodically, or responsively broadcasts the message fragments over the network 106. The broadcast module 206 may multicast the message fragments over the network 106, allowing whichever client devices 104 are currently analyzing the network to receive the message fragments. The broadcast module 206 may not require the client devices 104 to confirm or otherwise acknowledge receipt of any message fragments.

Still referring to FIG. 2, in some embodiments, each client device 104 establishes an environment 210 during operation. The illustrative environment 210 includes a firmware environment 212 and an operating system 222. The various modules or components of the environment 210 may be embodied as hardware, firmware, software, or a combination thereof. Additionally, in some embodiments, some or all of the modules of the firmware environment 212 and/or the operating system 222 may be integrated with, or form part of, other modules or software/firmware structures.

The firmware environment 212 includes a network module 214, a fountain decoding module 216, an update management module 218, and a boot target 220. The firmware environment 212 may be embodied as platform firmware that implements the uniform extensible firmware interface (UEFI) specification (i.e., a UEFI BIOS). Additionally or alternatively, the firmware environment 212 may be embodied as firmware of the manageability engine 152. The network module 214 is configured to periodically analyze the network 106 to receive any message fragments broadcast by the management server 102. The network module 214 may include, for example, a filter driver configured to filter multicast network traffic received over the network 106.

The fountain decoding module 216 is configured to decode the message fragments received by the network module 214. The fountain decoding module 216 may decode the completed message after receiving a sufficient number of message fragments. Due to the characteristics of fountain code algorithms, the fountain decoding module 216 may not need to receive any particular message fragments or may not need to receive the message fragments in any particular order. To decode message fragments received over several boot events, the fountain decoding module 216 may store the message fragments (including decoded or partially decoded message fragments) in the firmware cache 150. As described above, the completed message includes the management data supplied by the management server 102.

The update management module 218 is configured to parse the completed message received from the management server 102, determine whether the included management data should be installed on the client device 104, and install the management data if necessary. The management data may be installed by updating platform configuration data 224 of the client device 104. That platform configuration data 224 may be embodied as any files, volumes, executables, firmware images, global variables, or other settings affecting the operation of the client device 104. In some embodiments, the platform configuration data 224 may be embodied as one or more software applications installed on the client device 104.

The boot target 220 is configured to terminate boot services and initiate an operating system loader that in turn launches the operating system 222. The boot target 220 may be selected among several potential boot targets based on platform policy, for example according to the uniform extensible firmware interface (UEFI) specification. The boot target 220 may cause the operating system 222 to launch after the client device 104 receives one or more message fragments and determines that the message is not yet complete. Of course, the boot target 220 may also cause the operating system 222 to launch in response to installing updated management data.

Figure 3:
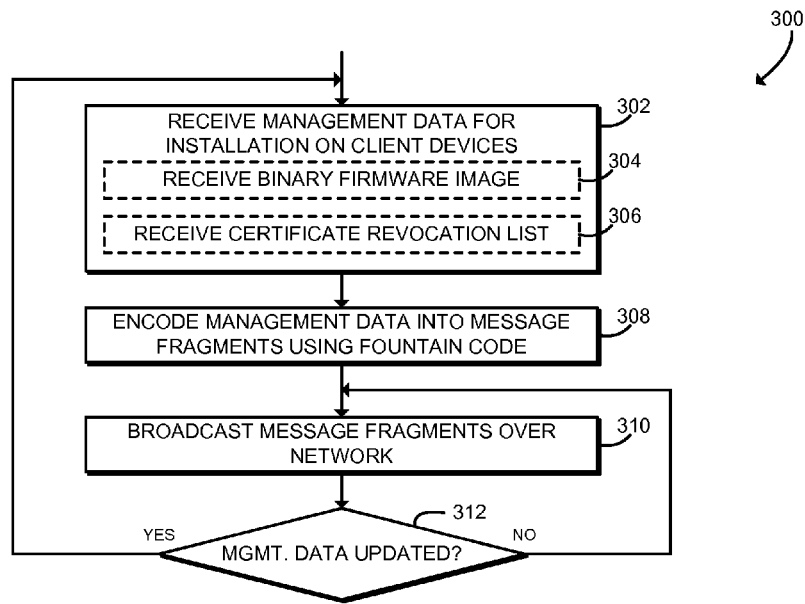
FIG. 3 is a simplified flow diagram of at least one embodiment of a method for broadcasting management information that may be executed by the management server of FIGS. 1 and 2.

Referring now to FIG. 3, in use, the management server 102 may execute a method 300 for broadcasting management information. The method 300 begins with block 302, in which the management server 102 receives or retrieves management data for installation on one or more client devices 104. The management data may be received or retrieved from a network administrator, from a management application, from an enterprise server, or from any other entity or process responsible for management of the client devices 104. The management data may be configured for installation on all of the client devices 104 or on a subset of the client devices 104. The management data may be embodied as any information, code, settings, or other data that may be used to provision, configure, or otherwise manage the client devices 104. For example, in some embodiments, in block 304 the management server 102 may receive or retrieve a binary firmware image for installation on the client devices 104. The binary firmware image may include one or more drivers, applications, or configuration settings used by the client device 104. For example, the binary firmware image may enable the use of certain enterprise-wide resources on each client device 104. Additionally or alternatively, in some embodiments in block 306 the management server 102 may receive or retrieve a certificate revocation list. The certificate revocation list may be used by each client device 104 for authenticating digital signatures. For example, as further described below, the certificate revocation list may be a "dbx" certificate database specified by the UEFI specification and used during a secure boot process.

In block 308, the management server 102 encodes the management data into a number of message fragments using a fountain code algorithm. A fountain code—also known as a rateless erasure code—encodes a finite set of input symbols into an unbounded length of encoded output symbols. In other words, the fountain code transforms a set of input data (such as the management data) into an unbounded stream of encoded data. Typically, the original input symbols may be recovered from any set of encoded symbols including more than a threshold number of encoded symbols. An ideal fountain code would allow recovery of the input symbols given an equal number of encoded symbols; in practice, a slightly larger number of encoded symbols may be required to recover the input symbols. Thus, the management server 102 applies a fountain code algorithm to the management data or a formatted message including the management data (the input symbols) and generates encoded message fragments (the encoded output symbols). The management server 102 may employ any suitable fountain code algorithm including but not limited to an LT code algorithm or a Raptor code algorithm.

In block 310, the management server 102 broadcasts the message fragments over the network 106, so that one or more client devices 104 may receive the message fragments. The management server 102 may multicast the message fragments or otherwise transmit each message fragment simultaneously to any receiving client devices 104. The management server 102 may broadcast the message fragments without waiting for receipt of an acknowledgment or confirmation from any client device 104. The management server 102 may continually, periodically, or responsively broadcast the message fragments at any data rate appropriate for the network 106.

In block 312, the management server 102 determines whether the management data has been or should be updated. For example, the management server 102 may receive a request from a network administrator to update the management information. If the management data should be updated, the method 300 loops back to block 302 to receive the updated management data. If the management data should not be updated, the method 300 loops back to block 310 to continue broadcasting the message fragments over the network 106.

Figure 4:
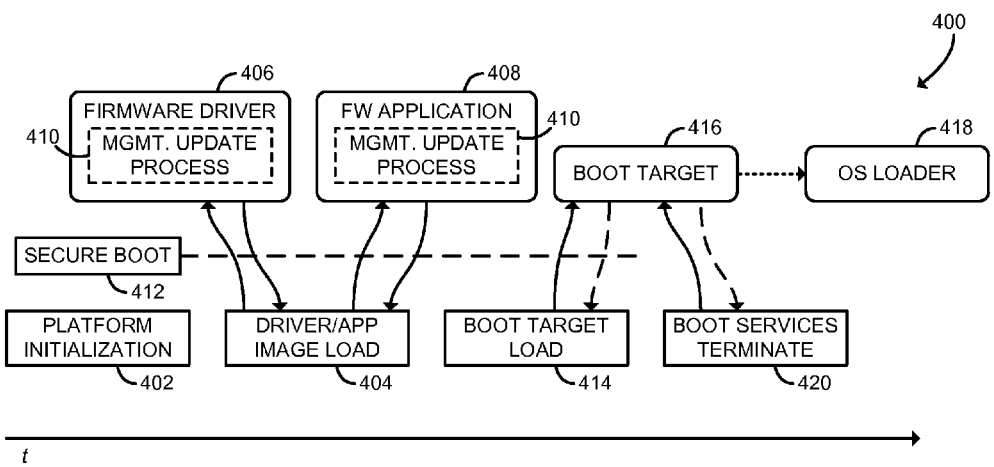
FIG. 4 is a simplified schematic diagram of at least one embodiment of a boot process that may be executed by a client device of FIGS. 1 and 2.

Referring now to FIG. 4, in use, a client device 104 may execute a boot process 400 according to the UEFI specification. The boot process 400 may be executed whenever the client device 104 is powered on, including when the client device 104 is powered on from a full electrical or mechanical "off" state, when the client device 104 is powered from a "soft-off" power state, when the client device 104 is reset or rebooted, or when the client device 104 is awoken from a sleep state. During execution of the boot process 400, the client device 104 may be under full control of the firmware environment 212. In block 402, the client device 104 initializes platform hardware. For example, the client device 104 may initialize particular components required to load or otherwise process the firmware environment 212, for example the memory 144 and the I/O subsystem 142.

In block 404, the client device 104 loads and starts firmware images for one or more firmware drivers 406 or firmware applications 408. Firmware drivers 406 and firmware applications 408 are binary images that may be stored in a system partition of the data storage device 146. The particular drivers and applications to be loaded are platform-dependent and may be enumerated in global variables of the client device 104, for example, in platform flash memory of the client device 104. The client device 104 may enumerate the firmware drivers 406 and applications 408 to be loaded and determine a required boot order. The boot order may be based on dependencies between the firmware drivers 406 and applications 408.

Firmware drivers 406 and applications 408 are similar, except that applications 408 are generally unloaded from the memory 144 after returning from their entry point, and drivers 406 generally stay resident in the memory 144 unless they return with an error code. Firmware drivers 406 and applications 408 may initialize or control hardware of the client device 104. Firmware drivers 406 or applications 408 may also install firmware protocol interfaces, which define function call interfaces and, after being installed, allow other firmware images to invoke provided services. For example, one or more firmware drivers 406 or applications 408 may install protocols to allow the client device 104 to access the communication circuit 148 and/or receive broadcast management information. In some embodiments, a management update process 410 may be performed as a firmware driver 406 and/or as a firmware application 408. The management update process 410 may receive and/or install management data broadcasted by the management server 102, as further described below in connection with FIG. 5.

The boot process 400 further includes a secure boot subsystem 412. The secure boot subsystem 412 may authenticate every firmware image prior to the image being loaded. The secure boot subsystem 412 may authenticate the firmware image, for example, by validating a digital signature associated with the particular firmware image against a set of trusted certificates. The secure boot subsystem 412 may maintain or otherwise reference one or more databases including authorized certificates (a "whitelist") or forbidden certificates (a "blacklist" or a "certificate revocation list").

For example, the UEFI specification defines that allowed certificates are stored in the signature database "db" (also known as the SECURITY_DATABASE) and that forbidden certificates are stored in the signature database "dbx" (also known as the SECURITY_DATABASE1). Authenticating each firmware image prior to loading may improve security by allowing the client device 104 to ensure that all software executing during the boot process 400 (including each boot target 416, described below) originates from a trusted source.

In block 414, the client device 104 determines and loads a boot target 416. A boot target 416 is a firmware application that may be loaded and started by the client device 104. Therefore, the boot target 416 may also be subject to the secure boot subsystem 412. Boot targets are typically operating system loaders, although the boot target may include diagnostic, maintenance, or management applications. The particular boot target 416 selected may be specified in global variables of the client device 104, for example stored in the platform flash memory. The global variables of the client device 104 may specify several boot targets 416, including a relative ordering of the boot targets 416. In some embodiments, the boot target 416 may be selected by a user of the client device 104 through a menu or other means presented on the client device 104. In some embodiments, the client device 104 may include a default boot target 416 or default rules for selecting a boot target 416.

In the boot target 416, the client device 104 hands off control to an operating system loader 418. Such operating system loader 418 may not be stored in the system partition of the data storage device 146. As part of the handoff, the boot target 416 may advance to block 420 to terminate boot services, for example by calling the UEFI function ExitBootServices( ). Therefore, if such a boot target 416 is successful, the boot process 400 is complete, and the operating system 222 is in full control of the client device 104. Only firmware services that have been specifically designated as runtime-capable remain available after control has been passed to the operating system 222. Therefore, in many embodiments, any firmware drivers 406 or applications 408 allowing access to the communication circuitry 148 are no longer available after boot services are terminated. If boot services are not terminated by the boot target 416, for example if the operating system loader 418 fails to load the operating system 222, the client device 104 may attempt to load another boot target 416.

Figure 5:
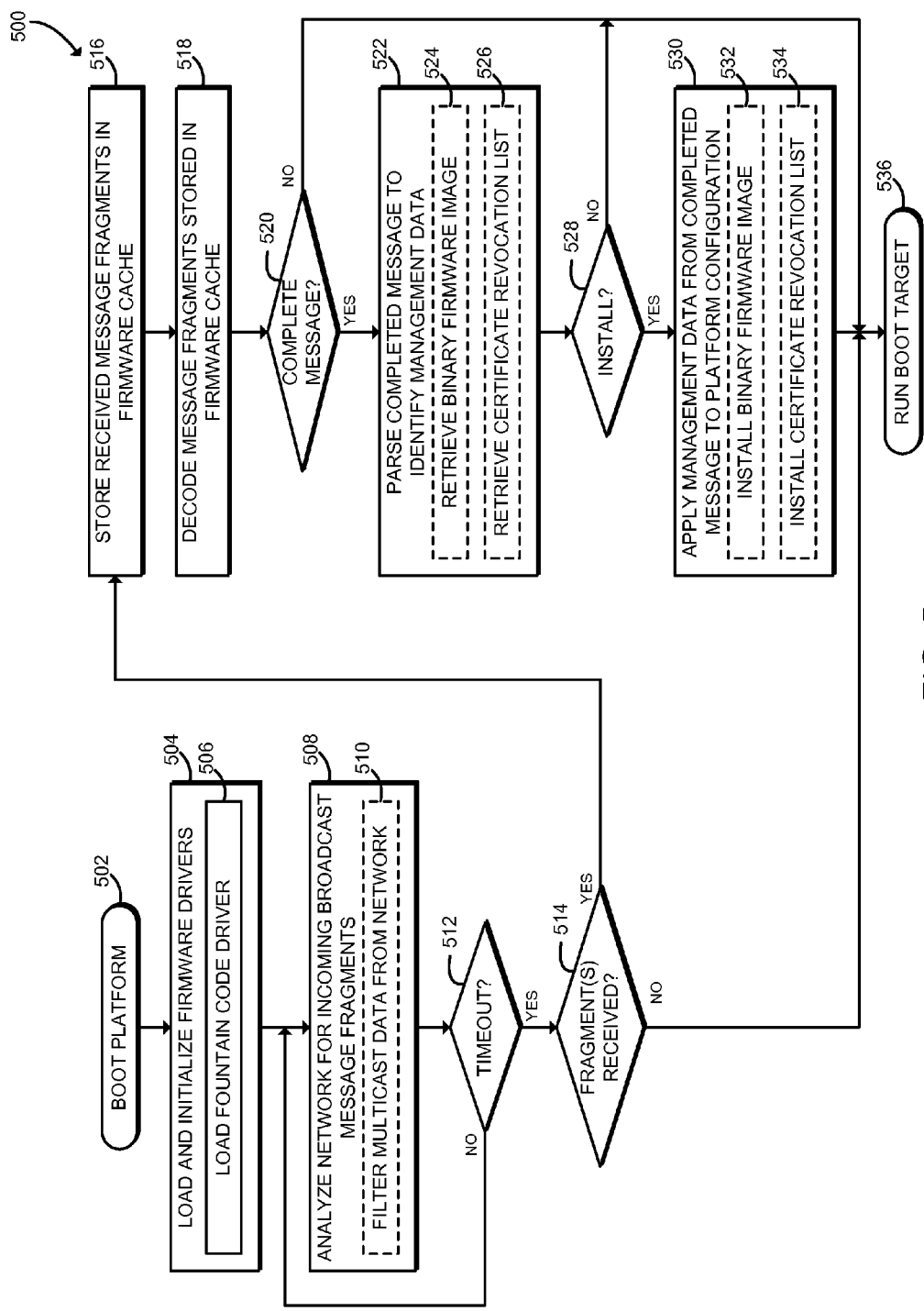
FIG. 5 is a simplified flow diagram of at least one embodiment of a method for receiving broadcast management information that may be executed by a client device of FIGS. 1 and 2.

Referring now to FIG. 5, in use, a client device 104 may execute a method 500 for receiving broadcast management data. The method 500 begins with block 502, in which the client device 104 is booted up. As described above, the client device 104 may be booted in response to powering on the platform, resetting the platform, or waking the platform from a sleep state. As further described above, upon boot the client device 104 may execute the boot process 400, including loading various firmware drivers 406 and applications 408. The various operations of the method 500 may thus be performed by one or more firmware drivers 406 or firmware applications 408.

In block 504, the client device 104 loads and initializes firmware drivers 406 and/or firmware applications 408. As described above, the firmware drivers 406 and firmware applications 408 may be loaded as part of the boot process 400. The client device 104 may load firmware drivers 406 and/or applications 408 to allow the client device 104 to receive broadcast management data, for example network interface drivers. In block 506, the client device 104 loads a fountain code driver. The fountain code driver may be configured to perform various operations of the method 500 including analyzing the network 106 and decoding received message fragments. The fountain code driver may be embodied as a firmware driver 406. Accordingly, the fountain code driver may be loaded after dependencies are satisfied by loading other firmware drivers 406 and/or firmware applications 408. After loading the fountain code driver, the client device 104 may continue the boot process 400, for example by loading additional firmware drivers 406 and/or firmware applications 408.

In block 508, the client device 104 analyzes the network 106 for incoming message fragments. The client device 104 may sample, read, open, or otherwise gather data from the network 106 to receive incoming message fragments. Those message fragments may have been generated by the management server 102 using a fountain code algorithm, as described above. The client device 104 may sample for any network traffic appearing on the communication circuit 148; there is no need for the client device 104 to wait for, acknowledge, or otherwise synchronize with the management server 102. In some embodiments, in block 510 the client device 104 may sample the network by filtering any multicast data received over the network 106 from the management server 102. For example, the client device 104 may install a filter driver to recognize and process multicast data.

In block 512, the client device 104 determines whether a timeout for analyzing the network 106 for message fragments has occurred. As described above, a fountain code requires a certain minimum number of message fragments to decode the completed message. Therefore, analyzing the network 106 for a longer time, and thereby potentially receiving more message fragments, may reduce the amount of time and/or number of platform boot events required to decode the message. However, decreasing the duration of the boot process is generally desirable for many client devices 104, and many operating systems 222 specify limits on total duration of the boot process. Therefore, various embodiments may use different timeouts in order to balance the amount of message fragments sampled and the speed of the boot process. The length of the timeout may be determined according to platform policy. For example, a consumer client device 104 may use a relatively short timeout that may allow receiving a single message fragment to emphasize speed in the boot process. As another example, an enterprise client device 104 may use a relatively long timeout on the order of a second or several seconds, to increase the probability that many message fragments may be received for each boot event. Additionally or alternatively, in some embodiments the timeout may correspond to the end of the boot process 400. In other words, in those embodiments the client device 104 may analyze the network 106 until the boot process 400 is completed and the operating system 222 is ready to load. If the timeout has not expired, the method 500 loops back to block 508 to continue analyzing the network 106. If the timeout has expired, the method 500 advances to block 514.

In block 514, the client device 104 determines whether any message fragments were received from the network 106 prior to expiration of the timeout. If no message fragments were received, then the method 500 branches ahead to block 536 to continue booting the client device 104. As described further below, the client device 104 may receive message fragments in response to future boot events. If, however, any message fragments were received prior to expiration of the timeout, the method 500 advances to block 516.

In block 516, the client device 104 stores the received message fragments in the firmware cache 150. As described above, the firmware cache 150 may be embodied as any non-volatile storage medium accessible to the firmware environment 212. Thus, the cached message fragments may be used during subsequent boot events to decode the message. Of course, the firmware cache 150 may also include cached message fragments stored during previous boot events. Accordingly, the message fragments may accumulate in the firmware cache 150 over several boot events.

In block 518, the client device 104 decodes the message fragments stored in the firmware cache 150 to generate at least a part of the source message. As described above, the client device 104 employs an appropriate decoding algorithm for the particular fountain code used to encode the message fragments. The particular operations and data stored by the client device 104 may depend on the fountain code in use. For example, for an LT code the client device 104 may iteratively update values of message fragments stored in the firmware cache 150 based on the contents of decoded fragments (i.e., fragments with a degree of one). In some embodiments, individual message fragments may be partially decoded based on more-recently received message fragments. Continuing the previous example, for an LT code the client device 104 may reduce the degree of a cached message fragment based on a more-recently received message fragment. The client device 104 may update the message fragments in-place or otherwise store the decoded or partially-decoded message fragments in the firmware cache 150.

In block 520, the client device 104 determines whether a complete message has been received. The method used to determine whether the message is complete depends on the particular fountain code employed. For example, for an LT code the client device 104 may determine whether all message fragments have a degree of one. If a complete message has not been received, the method 500 branches ahead to block 536 to run a boot target 416, as described below. If a complete message has been received, the method 500 advances to block 522.

In block 522, the client device 104 parses the completed message to identify the included management data. The message may be formatted in any data format suitable for transmission of the management data. The message may also include additional headers or other metadata describing the management data. For example, the message may be formatted as a firmware volume containing the management data. Of course, in some embodiments the message may include the raw management data itself. In some embodiments, in block 524 the client device 104 retrieves a binary firmware image from the message, such as a firmware driver 406 or a firmware application 408. In some embodiments, in block 526 the client device 104 retrieves a certificate revocation list from the message, such as a "dbx" database as specified by the UEFI specification. The management data may be embodied as the retrieved firmware image and/or certificate revocation list.

In block 528, the client device 104 determines whether to install the management data. The client device 104 may apply any appropriate criteria to determine whether to install the management data. For example the client device 104 may determine whether the management data is compatible with or applicable to the client device 104, or if the management data has already been installed on the client device 104. If the client device 104 determines not to install the management data, the method 500 branches ahead to block 536 to run a boot target 416, as described below. If the management data is to be installed, the method 500 advances to block 530.

In block 530, the client device 104 installs the management data by applying the management data to the platform configuration data 224 of the client device 104. The client device 104 may perform any action, modify any setting, or store any files or data required to install the management data. Further, the management data may be installed temporarily (e.g., into the memory 144) or permanently (e.g., into the data storage 146). In some embodiments, in block 532 the client device 104 may install the binary firmware image. For example, the client device 104 may load and execute the firmware image and/or store the firmware image into a system partition of the data storage 146. In some embodiments, in block 534 the client device 104 may install the certificate revocation list. For example, the client device 104 may store the "dbx" forbidden certificate database into a global variable in the platform flash memory.

In block 536, the client device 104 runs a boot target 416, which completes the method 500. As described above, the boot target 416 typically starts an operating system loader 418 that in turn launches the operating system 222. After the operating system 222 is launched (and boot services are terminated), the firmware environment 212 is no longer in control of the platform hardware of the client device 104. Thus, the client device 104 may not receive and/or respond to fountain code message fragments during execution of the operating system 222. The method 500 may be executed again during the next platform boot event. For example, the method 500 may be executed again when the client device 104 is physically power-cycled, rebooted, or wakes from a sleep state.

Although the preceding disclosure has described the method 500 as being executed by the client device 104 in the firmware environment 212 in response to a platform boot event, it should be understood that in some embodiments the method 500 may be executed at any time the firmware environment 212 is in control of the client device 104. Additionally or alternatively, in some embodiments parts or all of the method 500 may be executed by the manageability engine 152 in an out-of-band manner. For example, the method 500 may be executed by a combined security and manageability engine (CSME) or other microcontroller included in a system-on-a-chip (SoC) package of the client device 104. In such examples, the method 500 may be executed at runtime while the processor 140 is otherwise active or during additional power state transitions beyond boot events, including transitions to or from active idle states of the SoC (e.g., an SOix state). For example, the manageability engine 152 may continually, periodically, or responsively analyze the network 106 to receive message fragments broadcast by the management server 102 and recover management data. The manageability engine 152 may apply the management data directly, for example by updating SECURITY_DATABASE and/or SECURITY_DATABASE1 directly if the manageability engine 152 has direct access to the UEFI variable store. Additionally or alternatively, the manageability engine 152 may expose the updates to those databases for update by the UEFI firmware upon a subsequent platform restart event.

EXAMPLES

Illustrative examples of the technologies disclosed herein are provided below. An embodiment of the technologies may include any one or more, and any combination of, the examples described below.

Example 1 includes a client device for receiving broadcast management information, the client device comprising a network module to analyze a network interface of the client device during a boot process of the client device to receive message fragments broadcast by a management server; a fountain decoding module to (i) decode the message fragments to generate at least a part of a message using a fountain code decoding algorithm, and (ii) determine whether the message is complete in response to generation of the at least a part of the message; and an update management module to (i) parse the message to identify management data included in the message by the management server in response to a determination that the message is complete, and (ii) apply the management data to the client device.

Example 2 includes the subject matter of Example 1, and further including a firmware environment to establish the network module, the fountain code module, and the update management module.

Example 3 includes the subject matter of any of Examples 1 and 2, and wherein the fountain code decoding module is further to store the message fragments in a firmware cache of the client device; to decode the message fragments comprises to decode the message fragments stored in the firmware cache; and to determine whether the message is complete comprises to determine whether the message is complete in response to decoding of the message fragments stored in the firmware cache.

Example 4 includes the subject matter of any of Examples 1-3, and wherein the network module is to analyze the network interface and the fountain code decoding module is to decode the message fragments and determine whether the message is complete a second time in response to a reboot of the client device.

Example 5 includes the subject matter of any of Examples 1-4, and further including a boot target to load an operating system of the client device in response to a determination that the message is not complete or in response to application of the management data.

Example 6 includes the subject matter of any of Examples 1-5, and wherein the update management module is further to determine whether the management data is compatible with the client device in response to parsing of the message; and to apply the management data further comprises to apply the management data in response to a determination that the management data is compatible with the client device.

Example 7 includes the subject matter of any of Examples 1-6, and wherein the fountain code decoding algorithm comprises an LT code, a Raptor code, or a RaptorQ code.

Example 8 includes the subject matter of any of Examples 1-7, and wherein the management data comprises a binary firmware image included in the message.

Example 9 includes the subject matter of any of Examples 1-8, and wherein the management data comprises a certificate revocation list included in the message.

Example 10 includes the subject matter of any of Examples 1-9, and wherein the certificate revocation list comprises a secure boot blacklist.

Example 11 includes the subject matter of any of Examples 1-10, and wherein the management data comprises a software application included in the message.

Example 12 includes the subject matter of any of Examples 1-11, and further including a manageability engine comprising the network module, the fountain decoding module, and the update management module.

Example 13 includes the subject matter of any of Examples 1-12, and further including an in-band processor to execute an operating system of the client device; wherein the network module is further to analyze the network interface of the client device during execution of the operating system to receive message fragments broadcast by the management server.

Example 14 includes the subject matter of any of Examples 1-13, and wherein to analyze the network interface comprises to analyze the network interface to receive message fragments encoded using a fountain code encoding algorithm.

Example 15 includes the subject matter of any of Examples 1-14, and wherein to analyze the network interface comprises to filter multicast data broadcast over a network by the management server.

Example 16 includes the subject matter of any of Examples 1-15, and wherein the network interface comprises a wireless network interface of the client device.

Example 17 includes a management server for broadcasting management information, the management server comprising a fountain encoding module to encode management data into a plurality of message fragments using a fountain code encoding algorithm; and a broadcast module to broadcast the plurality of message fragments continually on a network accessible by a plurality of client devices.

Example 18 includes the subject matter of Example 17, and wherein the management data comprises a binary firmware image.

Example 19 includes the subject matter of any of Examples 17 and 18, and wherein the management data comprises a certificate revocation list.

Example 20 includes the subject matter of any of Examples 17-19, and wherein the certificate revocation list comprises a secure boot blacklist.

Example 21 includes a method for receiving broadcast management information, the method comprising analyzing, by a client device, a network interface of the client device during a boot process of the client device to receive message fragments broadcast by a management server; decoding, by the client device, the message fragments to generate at least a part of a message using a fountain code decoding algorithm; determining, by the client device, whether the message is complete in response to decoding the message fragments; parsing, by the client device, the message to identify management data included in the message by the management server in response to determining that the message is complete; and applying, by the client device, the management data to the client device.

Example 22 includes the subject matter of Example 21, and wherein analyzing the network interface, decoding the message fragments, determining whether the message is complete, parsing the message, and applying the management data are all performed by a firmware environment of the client device.

Example 23 includes the subject matter of any of Examples 21 and 22, and further including storing, by the client device, the message fragments in a firmware cache of the client device, wherein: decoding the message fragments comprises decoding the message fragments stored in the firmware cache; and determining whether the message is complete comprises determining whether the message is complete in response to decoding the message fragments stored in the firmware cache.

Example 24 includes the subject matter of any of Examples 21-23, and further including rebooting the client device; and analyzing the network interface, decoding the message fragments, and determining whether the message is complete a second time in response to rebooting the client device.

Example 25 includes the subject matter of any of Examples 21-24, and further including loading, by the client device, an operating system of the client device in response to determining the message is not complete or in response to applying the management data.

Example 26 includes the subject matter of any of Examples 21-25, and further including determining, by the client device, whether the management data is compatible with the client device in response to parsing the message; wherein applying the management data further comprises applying the management data in response to determining that the management data is compatible with the client device.

Example 27 includes the subject matter of any of Examples 21-26, and wherein decoding the message fragments comprises decoding the message fragments using one of an LT code, a Raptor code, or a RaptorQ code.

Example 28 includes the subject matter of any of Examples 21-27, and wherein applying the management data comprises installing a binary firmware image included in the message.

Example 29 includes the subject matter of any of Examples 21-28, and wherein applying the management data comprises installing to the client device a certificate revocation list included in the message.

Example 30 includes the subject matter of any of Examples 21-29, and wherein installing the certificate revocation list comprises installing to the client device a secure boot blacklist.

Example 31 includes the subject matter of any of Examples 21-30, and wherein applying the management data comprises installing to the client device a software application included in the message.

Example 32 includes the subject matter of any of Examples 21-31, and wherein analyzing the network interface, decoding the message fragments, and determining whether the message is complete are all performed by a manageability engine of the client device.

Example 33 includes the subject matter of any of Examples 21-32, and further including executing, by an in-band processor of the computing device, an operating system of the client device; and analyzing, by the manageability engine of the computing device, the network interface of the client device during execution of the operating system to receive message fragments broadcast by the management server.

Example 34 includes the subject matter of any of Examples 21-33, and wherein analyzing the network interface comprises analyzing the network interface to receive message fragments encoded using a fountain code encoding algorithm.

Example 35 includes the subject matter of any of Examples 21-34, and wherein analyzing the network interface comprises filtering multicast data broadcast over a network by the management server.

Example 36 includes the subject matter of any of Examples 21-35, and wherein analyzing the network interface comprises analyzing a wireless network interface of the client device.

Example 37 includes a method for broadcasting management information, the method comprising encoding, by a management server, management data into a plurality of message fragments using a fountain code encoding algorithm; and broadcasting, by the management server, the plurality of message fragments continually on a network accessible by a plurality of client devices.

Example 38 includes the subject matter of Example 37, and wherein encoding the management data comprises encoding a binary firmware image.

Example 39 includes the subject matter of any of Examples 37 and 38, and wherein encoding the management data comprises encoding a certificate revocation list.

Example 40 includes the subject matter of any of Examples 37-39, and wherein encoding the certificate revocation list comprises encoding a secure boot blacklist.

Example 41 includes a computing device comprising a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a client device for receiving broadcast management information, the client device comprising means for analyzing a network interface of the client device during a boot process of the client device to receive message fragments broadcast by a management server; means for decoding the message fragments to generate at least a part of a message using a fountain code decoding algorithm; means for determining whether the message is complete in response to decoding the message fragments; means for parsing the message to identify management data included in the message by the management server in response to determining that the message is complete; and means for applying the management data to the client device.

Example 45 includes the subject matter of Example 44, and further including a firmware environment to establish the means for analyzing the network interface, the means for decoding the message fragments, the means for determining whether the message is complete, the means for parsing the message, and the means for applying the management data.

Example 46 includes the subject matter of any of Examples 44 and 45, and further including means for storing the message fragments in a firmware cache of the client device, wherein: the means for decoding the message fragments comprises means for decoding the message fragments stored in the firmware cache; and the means for determining whether the message is complete comprises means for determining whether the message is complete in response to decoding the message fragments stored in the firmware cache.

Example 47 includes the subject matter of any of Examples 44-46, and further including means for rebooting the client device; and means for analyzing the network interface, means for decoding the message fragments, and means for determining whether the message is complete a second time in response to rebooting the client device.

Example 48 includes the subject matter of any of Examples 44-47, and further including means for loading an operating system of the client device in response to determining the message is not complete or in response to applying the management data.

Example 49 includes the subject matter of any of Examples 44-48, and further including means for determining whether the management data is compatible with the client device in response to parsing the message; wherein the means for applying the management data further comprises means for applying the management data in response to determining that the management data is compatible with the client device.

Example 50 includes the subject matter of any of Examples 44-49, and wherein the means for decoding the message fragments comprises means for decoding the message fragments using one of an LT code, a Raptor code, or a RaptorQ code.

Example 51 includes the subject matter of any of Examples 44-50, and wherein the means for applying the management data comprises means for installing a binary firmware image included in the message.

Example 52 includes the subject matter of any of Examples 44-51, and wherein the means for applying the management data comprises means for installing to the client device a certificate revocation list included in the message.

Example 53 includes the subject matter of any of Examples 44-52, and wherein the means for installing the certificate revocation list comprises means for installing to the client device a secure boot blacklist.

Example 54 includes the subject matter of any of Examples 44-53, and wherein the means for applying the management data comprises means for installing to the client device a software application included in the message.

Example 55 includes the subject matter of any of Examples 44-54, and further including a manageability engine comprising the means for analyzing the network interface, the means for decoding the message fragments, and the means for determining whether the message is complete.

Example 56 includes the subject matter of any of Examples 44-55, and further including means for executing, by an in-band processor of the computing device, an operating system of the client device; and means for analyzing, by the manageability engine of the computing device, the network interface of the client device during execution of the operating system to receive message fragments broadcast by the management server.

Example 57 includes the subject matter of any of Examples 44-56, and wherein the means for analyzing the network interface comprises means for analyzing the network interface to receive message fragments encoded using a fountain code encoding algorithm.

Example 58 includes the subject matter of any of Examples 44-57, and wherein the means for analyzing the network interface comprises means for filtering multicast data broadcast over a network by the management server.

Example 59 includes the subject matter of any of Examples 44-58, and wherein the means for analyzing the network interface comprises means for analyzing a wireless network interface of the client device.

Example 60 includes a management server for broadcasting management information, the management server comprising means for encoding management data into a plurality of message fragments using a fountain code encoding algorithm; and means for broadcasting the plurality of message fragments continually on a network accessible by a plurality of client devices.

Example 61 includes the subject matter of Example 60, and wherein the means for encoding the management data comprises means for encoding a binary firmware image.

Example 62 includes the subject matter of any of Examples 60 and 61, and wherein the means for encoding the management data comprises means for encoding a certificate revocation list.

Example 63 includes the subject matter of any of Examples 60-62, and wherein the means for encoding the certificate revocation list comprises means for encoding a secure boot blacklist.

The invention claimed is:

1. A client device for receiving broadcast management information, the client device comprising:
   a network module to analyze a network interface of the client device during a boot process of the client device to receive message fragments broadcast by a management server;
   a fountain decoding module to (i) store the message fragments in a firmware cache of the client device, (ii) decode the message fragments stored in the firmware cache to generate at least a part of a message using a fountain code decoding algorithm, and (iii) determine whether the message is complete in response to decoding of the message fragments stored in the firmware cache and generation of the at least a part of the message; and
   an update management module to (i) parse the message to identify management data included in the message by the management server in response to a determination that the message is complete, and (ii) apply the management data to the client device;
   wherein the network module is to analyze the network interface and the fountain code decoding module is to decode the message fragments and determine whether the message is complete a second time in response to a reboot of the client device.

2. The client device of claim 1, further comprising a firmware environment to establish the network module, the fountain code module, and the update management module.

3. The client device of claim 1, wherein the management data comprises a binary firmware image included in the message.

4. The client device of claim 1, wherein the management data comprises a certificate revocation list included in the message.

5. The client device of claim 4, wherein the certificate revocation list comprises a secure boot blacklist.

6. The client device of claim 1, further comprising a manageability engine comprising the network module, the fountain decoding module, and the update management module.

7. The client device of claim 6, further comprising an in-band processor to execute an operating system of the client device;
   wherein the network module is further to analyze the network interface of the client device during execution of the operating system to receive message fragments broadcast by the management server.

8. A method for receiving broadcast management information, the method comprising:
   analyzing, by a client device, a network interface of the client device during a boot process of the client device to receive message fragments broadcast by a management server;
   storing, by the client device, the message fragments in a firmware cache of the client device;
   decoding, by the client device, the message fragments stored in the firmware cache to generate at least a part of a message using a fountain code decoding algorithm;
   determining, by the client device, whether the message is complete in response to decoding the message fragments stored in the firmware cache;
   rebooting the client device;

analyzing the network interface, decoding the message fragments, and determining whether the message is complete a second time in response to rebooting the client device;

parsing, by the client device, the message to identify management data included in the message by the management server in response to determining that the message is complete; and applying, by the client device, the management data to the client device.

9. The method of claim 8, wherein analyzing the network interface, decoding the message fragments, determining whether the message is complete, parsing the message, and applying the management data are all performed by a firmware environment of the client device.

10. The method of claim 8, wherein applying the management data comprises installing a binary firmware image included in the message.

11. The method of claim 8, wherein applying the management data comprises installing to the client device a certificate revocation list included in the message.

12. The method of claim 11, wherein installing the certificate revocation list comprises installing to the client device a secure boot blacklist.

13. One or more non-transitory, computer-readable storage media comprising a plurality of instructions that in response to being executed cause a client device to:

analyze a network interface of the client device during a boot process of the client device to receive message fragments broadcast by a management server;

store the message fragments in a firmware cache of the client device;

decode the message fragments stored in the firmware cache to generate at least a part of a message using a fountain code decoding algorithm;

determine whether the message is complete in response to decoding the message fragments stored in the firmware cache;

reboot the client device;

analyze the network interface, decode the message fragments, and determine whether the message is complete a second time in response to rebooting the client device;

parse the message to identify management data included in the message by the management server in response to determining that the message is complete; and apply the management data to the client device.

14. The one or more non-transitory, computer-readable storage media of claim 13, further comprising a plurality of instructions that in response to being executed cause the client device to: analyze the network interface, decode the message fragments, determine whether the message is complete, parse the message, and apply the management data by a firmware environment of the client device.

15. The one or more non-transitory, computer-readable storage media of claim 13, wherein to apply the management data comprises to install a binary firmware image included in the message.

16. The one or more non-transitory, computer-readable storage media of claim 13, wherein to apply the management data comprises to install to the client device a certificate revocation list included in the message.

17. The one or more non-transitory, computer-readable storage media of claim 16, wherein to install the certificate revocation list comprises to install to the client device a secure boot blacklist.

\* \* \* \* \*